US012629790B2

(12) United States Patent
Sasaki

(10) Patent No.: US 12,629,790 B2
(45) Date of Patent: May 19, 2026

(54) ELECTRIC TOOL SYSTEM

(71) Applicant: Panasonic Intellectual Property Management Co., Ltd., Osaka (JP)

(72) Inventor: Takayuki Sasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 400 days.

(21) Appl. No.: 18/263,848

(22) PCT Filed: Dec. 27, 2021

(86) PCT No.: PCT/JP2021/048622
§ 371 (c)(1),
(2) Date: Aug. 1, 2023

(87) PCT Pub. No.: WO2022/176404
PCT Pub. Date: Aug. 25, 2022

(65) Prior Publication Data
US 2024/0116150 A1 Apr. 11, 2024

(30) Foreign Application Priority Data
Feb. 19, 2021 (JP) ................................ 2021-025689

(51) Int. Cl.
*B23Q 17/24* (2006.01)
*B25B 23/147* (2006.01)
*G06T 7/00* (2017.01)
(52) U.S. Cl.
CPC ...... *B23Q 17/2452* (2013.01); *B25B 23/1475* (2013.01); *G06T 7/0004* (2013.01)

(58) Field of Classification Search
None
See application file for complete search history.

(56) References Cited

U.S. PATENT DOCUMENTS

| | | | |
|---|---|---|---|
| 2017/0197302 A1 | 7/2017 | Kobayashi | |
| 2019/0294138 A1* | 9/2019 | Dobashi | G05B 19/418 |
| 2022/0221834 A1 | 7/2022 | Dobashi et al. | |

FOREIGN PATENT DOCUMENTS

| | | |
|---|---|---|
| DE | 102012219871 A1 | 4/2014 |
| JP | 2015-229210 A | 12/2015 |

(Continued)

OTHER PUBLICATIONS

Extended European Search Report dated Jun. 25, 2024 issued in the corresponding European Patent Application No. 21926827.3.

(Continued)

*Primary Examiner* — Sean Shechtman
(74) *Attorney, Agent, or Firm* — Rimon P.C.

(57) ABSTRACT

An electric tool system includes an electric tool device and a history storage unit. The electric tool device includes a holder, a drive unit, a measuring unit, and an image capturing unit. The holder holds a fastening member thereon. The drive unit performs fastening work of fastening the fastening member into a work target by transmitting driving force to the holder. The measuring unit measures, as a torque measured value, a fastening torque value of the fastening work. The image capturing unit generates a captured image by capturing an image of at least the holder. The history storage unit stores history information in which the torque measured value and the captured image are associated with each other.

7 Claims, 4 Drawing Sheets

(56)  References Cited

FOREIGN PATENT DOCUMENTS

| JP | 2017-140681 | A | 8/2017 |
| JP | 2019-066365 | A | 4/2019 |
| JP | 2019-076980 | A | 5/2019 |

OTHER PUBLICATIONS

International Search Report dated Feb. 22, 2022 issued in International Patent Application No. PCT/JP2021/048622, with English translation.
Chinese Office Action dated May 19, 2025 issued in the corresponding Chinese Patent Application No. 202180091849.2, with English translation.

* cited by examiner

ELECTRIC TOOL SYSTEM

CROSS-REFERENCE OF RELATED APPLICATIONS

This application is the U.S. National Phase under 35 U.S.C. § 371 of International Patent Application No. PCT/JP2021/048622, filed on Dec. 27, 2021, which in turn claims the benefit of Japanese Patent Application No. 2021-025689, filed on Feb. 19, 2021, the entire disclosures of which Applications are incorporated by reference herein.

TECHNICAL FIELD

The present disclosure generally relates to an electric tool system, and more particularly relates to an electric tool system for fastening a fastening member into a work target.

BACKGROUND ART

Patent Literature 1 discloses a control device and a work management system that uses the control device. The control device communicates with a tool for use to perform the work of fastening a fastening member and with an image capture device for capturing an image of a work spot on which the work is performed. Through these communications, the control device stores, in association with each other, a value representing fastening torque applied by the tool to the fastening member and the image captured by the image capture device.

According to Patent Literature 1, the image capturing range of the image capture device (image capturing unit) is defined to substantially agree with the field of view of a worker who wears the control device. Thus, if the fastening work spot of the work target is a local spot falling outside of the worker's field of view, then the fastening member to be fastened at the fastening work spot falls outside of the image capturing range of the image capture device. That is to say, the control device and management system of Patent Literature 1 may fail to acquire and store history information depending on the given work target, which is unbeneficial.

CITATION LIST

Patent Literature

Patent Literature 1: JP 2015-229210 A

SUMMARY OF INVENTION

It is therefore an object of the present disclosure to provide an electric tool system with the ability to acquire and store history information irrespective of the work target.

An electric tool system according to an aspect of the present disclosure includes an electric tool device and a history storage unit. The electric tool device includes a holder, a drive unit, a measuring unit, and an image capturing unit. The holder holds a fastening member thereon. The drive unit performs fastening work of fastening the fastening member into a work target by transmitting driving force to the holder. The measuring unit measures, as a torque measured value, a fastening torque value of the fastening work. The image capturing unit generates a captured image by capturing an image of at least a part of the holder. The history storage unit stores history information in which the torque measured value and the captured image are associated with each other.

DESCRIPTION OF EMBODIMENTS

Embodiment

(1) Overview

An overview of an electric tool system 100 according to an exemplary embodiment will be described with reference to FIG. 1.

Figure 1:
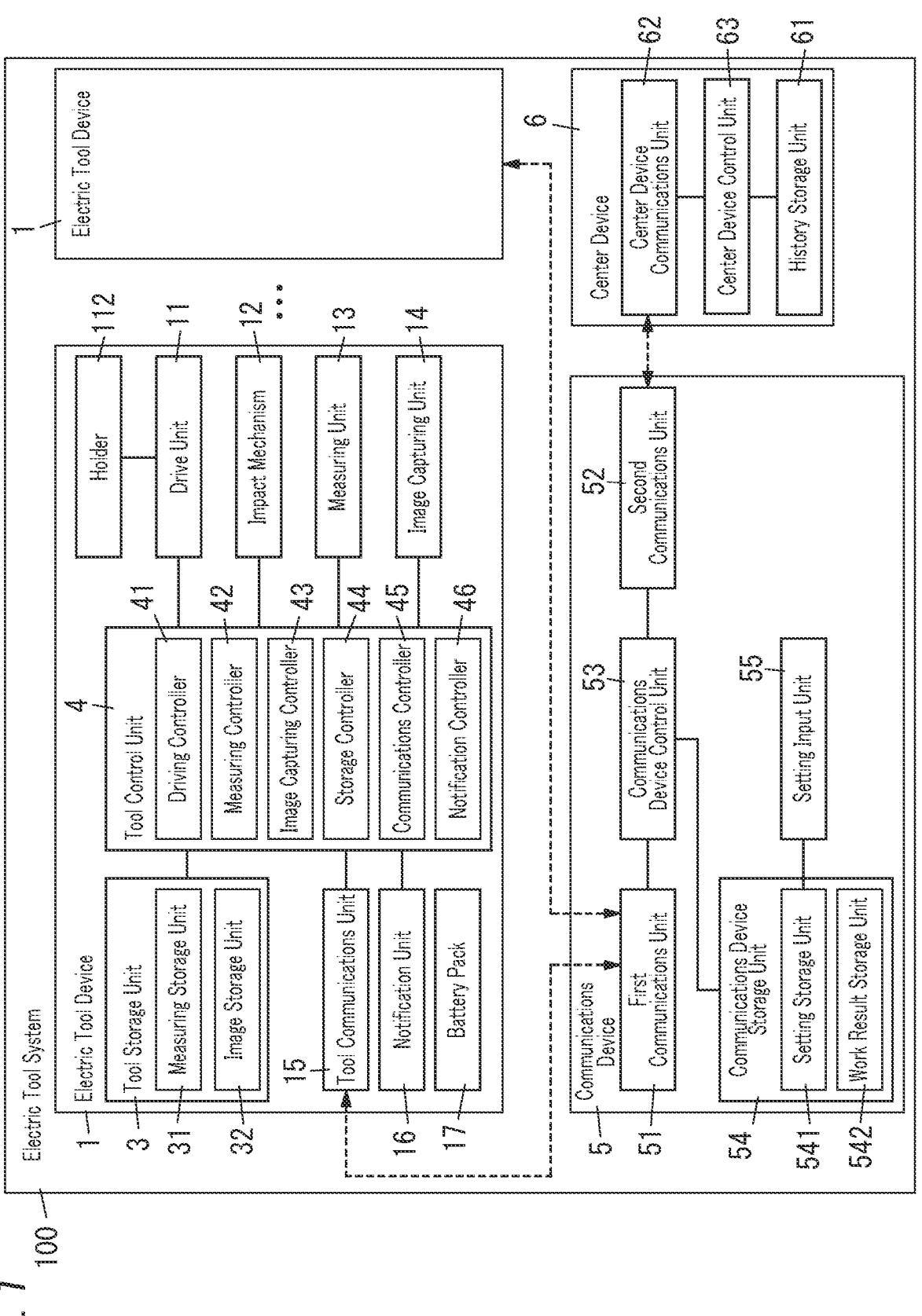
FIG. 1 is a block diagram illustrating a diagrammatic configuration for an electric tool system according to an exemplary embodiment of the present disclosure.

The electric tool system 100 according to this embodiment includes an electric tool device 1 and a history storage unit 61 as shown in FIG. 1. The electric tool system 100 according to this embodiment may be used, for example, in an assembly line on which the worker performs assembling work of a product at a factory. However, the electric tool system 100 does not have to be used in the assembly line but may also be used for any other purpose.

The electric tool device 1 is supposed to be used by the worker to perform the work of fastening a fastening member (such as a screw, a bolt, or a nut) into a work target (such as a consumer electronic appliance or a piece of furniture). More specifically, the work target is supposed to have a plurality of fastening work spots (such as screw holes) and the worker is supposed to perform the work of fastening the fastening member into each of the plurality of fastening work spots using the electric tool device 1. That is to say, the worker is supposed to perform multiple sessions of the fastening work on a single work target.

The electric tool device 1 includes a holder 112, a drive unit 11, a measuring unit 13, and an image capturing unit 14. The holder 112 holds a fastening member thereon. The drive unit 11 performs the fastening work of fastening the fastening member into a work target by transmitting driving force to the holder 112. The measuring unit 13 measures, as a torque measured value, a fastening torque value of the fastening work. The image capturing unit 14 generates a captured image by capturing an image of at least a part of the holder 112.

In this embodiment, the image capturing unit 14 is housed in the electric tool device 1 and generates a captured image by capturing an image of at least a part of the holder 112 that has finished the fastening work. The image capturing unit 14 is built in the electric tool device 1. This allows, even if the work has been done on a local spot falling outside of the worker's field of view, the image capturing unit 14 to capture an image of the holder 112 that has finished the fastening work. As used herein, the "work on a local spot" refers to, for example, either the work to be performed on so narrow a space as to allow only the barrel 21 (to be described later) of the electric tool device 1 to enter or the work that does not allow the worker to align his or her line of sight with the fastening work spot.

The history storage unit 61 stores history information in which the torque measured value and the captured image are associated with each other. This allows the administrator who manages the fastening work to check out the work history information stored in the history storage unit 61 after the worker has the work done to see if the fastening member has been attached to a predetermined spot properly with an intended degree of fastening torque applied to the fastening member.

For these reasons, the electric tool system 100 according to this embodiment may acquire, even if the fastening work spot of the work target is a local spot falling outside of the worker's field of view, a captured image of the holder 112, thus achieving the advantage of acquiring and storing history information irrespective of the work target.

(2) Detailed Configuration (2-1) Overall Configuration

Next, a detailed configuration for the electric tool system 100 according to this embodiment will be described with reference to FIGS. 1-3.

Figure 2:
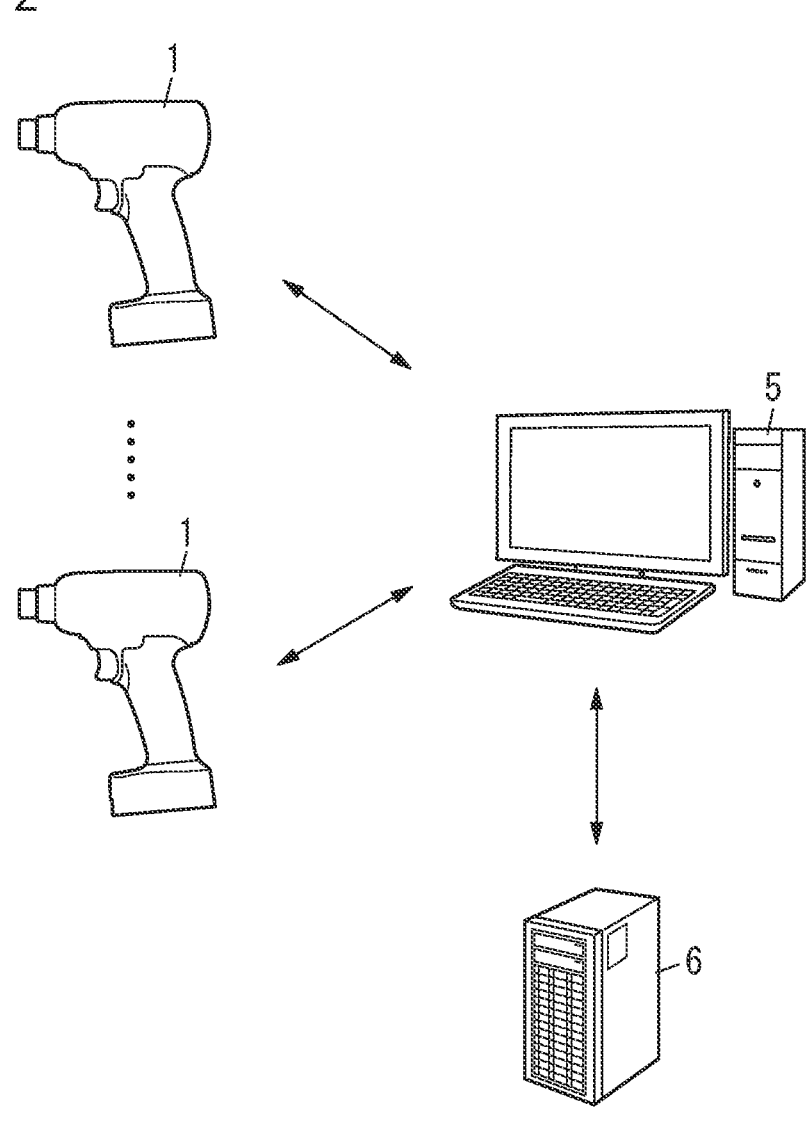
FIG. 2 is a schematic representation illustrating a diagrammatic configuration for the electric tool system.

As shown in FIG. 2, the electric tool system 100 according to this embodiment includes a plurality of electric tool devices 1, a communications device 5 which is ready to communicate with the plurality of electric tool devices 1, and a center device 6 which is ready to communicate with the communications device 5.

(2-2) Electric Tool Device

As shown in FIG. 1, the electric tool device 1 includes a drive unit 11, an impact mechanism 12, a measuring unit 13, an image capturing unit 14, a tool communications unit 15, a notification unit 16, a battery pack 17, a housing 2, a tool storage unit 3, and a tool control unit 4.

In the following description, a direction in which the barrel 21 and a grip 22 (to be described later) are arranged one on top of the other will be hereinafter defined as an "upward/downward direction" with the barrel 21 supposed to be located upward of the grip 22 and with the grip 22 supposed to be located downward of the barrel 21. Also, in the following description, a direction in which the barrel 21 and the holder 112 are arranged side by side will be hereinafter defined as a "forward/backward direction" with the holder 112 supposed to be located forward of the barrel 21 and with the barrel 21 supposed to be located backward of the holder 112. Nevertheless, these definitions should not be construed as limiting the directions in which the electric tool device 1 is supposed to be used.

Figures 3A, 3B:
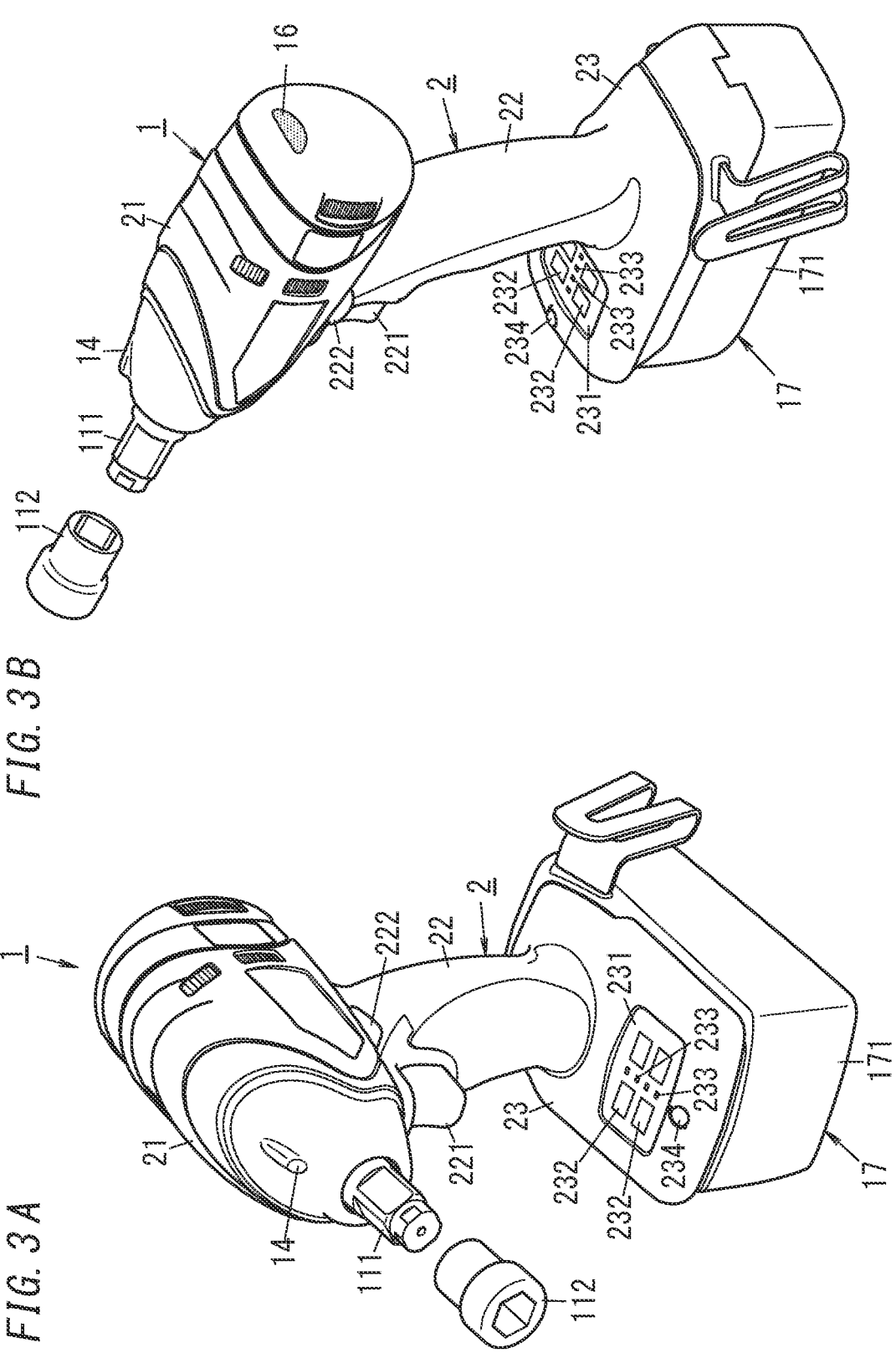
FIG. 3A is a perspective view illustrating the appearance, as viewed from a first direction, of an electric tool device included in the electric tool system.
FIG. 3B is a perspective view illustrating the appearance, as viewed from a second direction, of the electric tool device included in the electric tool system.

The housing 2 includes: the barrel 21 formed in a cylindrical shape; the grip 22 protruding along the radius of the barrel 21 from the circumferential surface of the barrel 21; and an attachment 23, to which the battery pack 17 is attached removably, as shown in FIGS. 3A and 3B.

The driving unit 11 is housed in the barrel 21. The drive unit 11 includes a motor. The drive unit 11 is configured to perform a rotary operation using, as its motive power, the power supplied from the battery pack 17 as a power source. An output shaft 111 protrudes from one axial end surface of the barrel 21 (refer to FIGS. 3A and 3B). The output shaft 111 is configured to turn as the drive unit 11 performs the rotary operation. The holder 112 for holding a fastening member (such as a screw or a nut) thereon is attached removably to the output shaft 111. The holder 112 may be a socket, for example. If the fastening member is a screw, then the socket is fitted onto the screw to cover the screw head of the screw to hold the screw thereon. If the fastening member is a nut, then the socket is fitted onto the nut to cover the nut entirely and thereby hold the nut thereon. The size of the socket attached to the output shaft 111 may be selected as appropriate by the worker according to the size of the fastening member. By turning the output shaft 111, the drive unit 11 transmits driving force to the holder 112. That is to say, in the electric tool device 1, as the drive unit 11 performs the rotary operation, the output shaft 111 turns, thus having the work of tightening or loosening the fastening member, which is held on the holder 112, done.

Alternatively, the holder 112 may also be a bit (such as a screwdriver bit) attached to a socket anvil, instead of the socket. This allows the bit (such as the screwdriver bit) to be attached via the socket anvil. If the fastening member is a screw, then the bit is fitted into the screw hole of the screw to hold the screw thereon. That is to say, the holder 112 may be any member which is brought into contact with the fastening member and transmits driving force to the fastening member to either tighten or loosen the fastening member.

The impact mechanism 12 is configured to apply impacting force to the drive unit 11. More specifically, the impact mechanism 12 is configured to, when (the work value of) fastening torque exceeds a predetermined level, apply impacting force in the rotational direction to the output shaft 111. This allows the electric tool device 1 to apply greater fastening torque to the fastening member.

The grip 22 is a part to be gripped by the worker while he or she is performing the work. The grip 22 is provided with a trigger switch 221 and a forward/reverse switch 222. The trigger switch 221 is a switch for controlling the ON/OFF states of the rotary operation performed by the drive unit 11 and enables adjusting the number of revolutions of the drive unit 11 according to how deep the trigger switch 221 is pulled. The forward/reverse switch 222 is a switch for changing the rotational direction of the output shaft 111 from the clockwise direction to the counterclockwise direction, and vice versa. The attachment 23 is provided at the other end portion, opposite from the barrel 21, of the grip 22.

The attachment 23 is formed in the shape of a compressed rectangular parallelepiped. The battery pack 17 is attached removably to one side, opposite from the grip 22, of the attachment 23. The battery pack 17 includes a case 171 (refer to FIGS. 3A and 3B) made of a resin and formed in a rectangular parallelepiped shape. The case 171 houses a rechargeable battery (such as a lithium-ion battery) inside. The battery pack 17 supplies electric power to the drive unit 11, the tool control unit 4, the image capturing unit 14, and other constituent members.

The attachment 23 is also provided with an operating panel 231. The operating panel 231 may include a plurality of press button switches 232 and a plurality of LEDs (light-emitting diodes) 233, for example. The operating panel 231 allows the worker to enter various types of settings for, and confirm the state of, the electric tool device 1. That is to say, by operating (e.g., the press button switches 232 of) the operating panel 231, the worker may power the electric tool device 1 ON and OFF and check the status of connection with the communications device 5, for example. The attachment 23 further includes a light emitter 234. The light emitter 234 may be implemented as an LED, for example. The light emitter 234 is arranged to emit light toward the work target while the worker is performing work. The light emitter 234 may be turned ON and OFF by operating the operating panel 231. Alternatively, the light emitter 234 may also be lit automatically when the trigger switch 221 turns ON.

The tool control unit 4 is also housed in the attachment 23. The tool control unit 4 preferably includes a computer system, for example. In the computer system, a processor such as a central processing unit (CPU) or a micro-processing unit (MPU) reads out a program stored in a memory and executes the program, thus performing the functions of a driving controller 41, a measuring controller 42, an image capturing controller 43, a storage controller 44, a communications controller 45, and a notification controller 46, for example. The computer system includes, as a principal hardware component, a processor that operates in accordance with the program. Any type of processor may be used as long as the processor may perform the intended functions by executing the program. The processor may be made up of a single or a plurality of electronic circuits including a semiconductor integrated circuit (IC) or a large-scale integrated circuit (LSI). Although the electronic circuit is herein called an IC or an LSI, the electronic circuit may be called by a different name depending on the degree of integration thereof. Examples of other alternative electronic circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be used for the same purpose. Those electronic circuits may be either integrated together on a single chip or distributed on multiple chips, whichever is appropriate. Those multiple chips may be aggregated together in a single device or distributed in multiple devices without limitation.

The tool storage unit 3 is further housed in the attachment 23. The tool storage unit 3 may be implemented as, for example, a magnetic core memory or a semiconductor memory and has the functions of a measuring storage unit 31 and an image storage unit 32. In this embodiment, the measuring storage unit 31 and the image storage unit 32 are implemented as a single memory. Alternatively, the measuring storage unit 31 and the image storage unit 32 may also be implemented as a plurality of memories. Still alternatively, the tool storage unit 3 may also be a memory card which is attached removably to the electric tool device 1.

The driving controller 41 is configured to control the drive unit 11. More specifically, the driving controller 41 is configured to control the drive unit 11 such that the fastening torque value becomes equal to a torque setting (to be described later). The driving controller 41 has a torque estimating function of estimating the magnitude of the fastening torque. Specifically, the driving controller 41 estimates, until the estimated value of the fastening torque reaches a torque seating value, the magnitude of the fastening torque based on the rotational velocity or a variation in the number of revolutions of the motor included in the drive unit 11 in the interval between the strokes applied by the impact mechanism 12. As used herein, the "torque seating value" refers to a fastening torque value at which the fastening member is expected to be seated on the work target to fasten. Next, when the estimated value of the fastening torque reaches the torque seating value, the driving controller 41 estimates the magnitude of the fastening torque based on the number of strokes applied by the impact mechanism 12. When finding the number of stokes applied by the impact mechanism 12 has reached a threshold number of times based on the torque setting, the driving controller 41 determines that the fastening torque have reached the torque setting and stops running the motor. Optionally, the electric tool device 1 may further include an acceleration sensor and the torque estimation mechanism may estimate the magnitude of the fastening torque based on a detection value of the acceleration sensor.

The measuring controller 42 is configured to control the measuring unit 13. The measuring unit 13 measures the maximum value of the fastening torque as a torque measured value. More specifically, the measuring unit 13 measures, as a torque measured value, the maximum value of the fastening torque applied by the impact mechanism 12 to the fastening member via the output shaft 111. The measuring unit 13 may be, for example, a torque sensor. The storage controller 44 makes the measuring storage unit 31 store the torque measured value measured by the measuring unit 13 in each of multiple sessions of the fastening work.

The image capturing controller 43 is configured to control the image capturing unit 14. In this embodiment, the image capturing unit 14 is implemented as a camera including an image sensor and a lens. The image capturing unit 14 is built in the barrel 21 of the housing 2 such that at least the holder 112 falls within its image capturing range. More exactly, the image capturing unit 14 according to this embodiment is arranged to be spaced from the output shaft 111 along the radius of the output shaft 111 to have its image capturing direction defined to be a direction pointing from the barrel 21 toward the holder 112 (i.e., forward direction) such that the holder 112 falls within its image capturing range. Specifically, the image capturing unit 14 is provided for a portion (i.e., an upper portion), opposite from the grip 22, of the barrel 21 such that the optical axis of the lens included in the image capturing unit 14 passes through the holder 112. Alternatively, the image capturing unit 14 may also be provided for a lower or side portion of the barrel 21 to have its image capturing direction defined to be a direction pointing from the barrel 21 toward the holder 112 (i.e., forward direction). The image capturing unit 14 according to this embodiment generates a captured image by capturing an image of the holder 112 after the drive unit 11 has finished the fastening work. More specifically, the image capturing unit 14 captures an image of the holder 112 after the drive unit 11 has finished the fastening work and the storage controller 44 has made the measuring storage unit 31 store the torque measured value.

Alternatively, the image capturing unit 14 may capture an image of the holder 112 and the fastening member. For example, if the holder 112 is a bit such as a screwdriver bit, then the holder 112 is fitted into the fastening member without covering the fastening member in its entirety, and therefore, the image capturing unit 14 may capture an image of the holder 112 and the fastening member. The storage controller 44 makes the image storage unit 32 store, in each of the multiple sessions of the fastening work, a captured image generated by the image capturing unit 14 in association with the torque measured value stored by the measuring storage unit 31 during that session.

The communications controller 45 is configured to control the tool communications unit 15. The tool communications unit 15 is configured to be ready to communicate with the first communications unit 51 of the communications device 5 (to be described later) and is housed in the housing 2. The tool communications unit 15 is a communications module which may establish wireless communication compliant with a communications protocol such as Wi-Fi®. Alternatively, the tool communications unit 15 may also be a communications module which may establish wired communication compliant with a communications protocol such as wired local area network (LAN). The communications controller 45 controls the tool communications unit 15 to transmit, to the first communications unit 51, the torque measured value and captured image stored in the tool storage unit 3, every time one session of the fastening work is done. In addition, the communications controller 45 also controls the tool communications unit 15 to transmit, to the first communications unit 51, a startup signal indicating that the electric tool device 1 has been started up.

The notification controller 46 is configured to control the notification unit 16 provided for the electric tool device 1. The notification unit 16 may be implemented as an LED, for example. The notification unit 16 is provided at the other end portion (i.e., rear end portion), opposite from the output shaft 111, of the barrel 21 of the housing 2 to allow the worker to view the notification unit 16 easily during the work (refer to FIG. 3B). The notification controller 46 may light the notification unit 16, for example, when the tool communications unit 15 has transmitted the torque measured value and the captured image to the first communications unit 51. The worker may recognize, by sensing, with the eye, the notification unit 16 be lit, that the tool communications unit 15 has transmitted the torque measured value and captured image to the first communications unit 51.

(2-3) Communications Device

As shown in FIG. 1, the communications device 5 includes the first communications unit 51, a second communications unit 52, a communications device control unit 53, and a communications device storage unit 54. The communications device 5 according to this embodiment receives data about the torque measured value and the captured image from each of the plurality of electric tool devices 1 and transmits the data to the center device 6.

The first communications unit 51 is configured to be ready to communicate with the respective tool communications units 15 of the plurality of electric tool devices 1. The second communications unit 52 is configured to be ready to communicate with a center device communications unit 62 of the center device 6 (to be described later). Each of the first communications unit 51 and the second communications unit 52 is a communications module which may establish wireless communication compliant with a communications protocol such as Wi-Fi®. Alternatively, each of the first communications unit 51 and the second communications unit 52 may also be a communications module which may establish wired communication compliant with a communications protocol such as wired local area network (LAN).

The communications device storage unit 54 includes a setting storage unit 541 and a work result storage unit 542 as shown in FIG. 1. The communications device storage unit 54 may be implemented as, for example, a magnetic core memory or a semiconductor memory.

The setting storage unit 541 stores setting information of the fastening work that the worker performs using the electric tool device 1. Examples of the setting information of the fastening work include a torque setting for the fastening work and a transmission condition for transmitting data to the center device 6. If the fastening work includes multiple sessions, then the setting information of the fastening work may include work order numbers of the multiple sessions of the fastening work. For example, the communications device 5 may further include a setting input unit 55 which allows the setting information of the fastening work to be entered. In that case, the communications device control unit 53 makes the setting storage unit 541 store the setting information that has been entered via the setting input unit

55. Optionally, the communications device 5 may further include a connection unit, to which a setting device is connected, and the communications device control unit 53 may make the setting storage unit 541 store setting information that has been entered through the setting device. Alternatively, the communications device control unit 53 may make the setting storage unit 541 store setting information that has been entered via the center device 6.

The communications device control unit 53 is configured to be ready to extract the setting information from the setting storage unit 541. More specifically, the communications device control unit 53 is configured to confirm that the first communications unit 51 has received the startup signal from the tool communications unit 15 and extract the setting information about the first session of the fastening work from the setting storage unit 541. In addition, the communications device control unit 53 is also configured to confirm that the work result storage unit 542 (to be described later) has stored a work result of the fastening work and extract setting information about the next session of the fastening work from the setting storage unit 541. The communications device control unit 53 controls the first communications unit 51 to transmit the setting information thus extracted to the tool communications unit 15. Thus, the driving controller 41 controls the drive unit 11 based on the torque setting that forms part of the setting information.

The communications device storage unit 54 stores, on a session-by-session basis, the torque measured values and captured images received from the plurality of electric tool devices 1 as the work result of the fastening work performed by the plurality of electric tool devices 1. More specifically, the work result storage unit 542 stores, on a session-by-session basis, the torque measured values and captured images received from the plurality of electric tool devices 1 as the work result of the fastening work performed by the plurality of electric tool devices 1. In this embodiment, the communications device control unit 53 controls the work result storage unit 542 to store, on a session-by-session basis, the torque measured values and captured images that the first communications unit 51 has received from the plurality of electric tool devices 1 as the work result of the fastening work performed by the plurality of electric tool devices 1. The work result storage unit 542 temporarily stores the work result until the transmission condition stored in the setting storage unit 541 is satisfied. This reduces the number of times to establish between the communications device 5 and the center device 6.

When finding the predetermined transmission condition satisfied, the communications device 5 transmits the work result, stored in the communications device storage unit 54, to the center device 6. More specifically, when finding the predetermined transmission condition satisfied, the communications device control unit 53 controls the second communications unit 52 to transmit the work result, stored in the work result storage unit 542, to the center device communications unit 62 of the center device 6. In this embodiment, the fastening work includes multiple sessions. The transmission condition is that the work result storage unit 542 store the work result of a preset one of the multiple sessions of the fastening work. Specifically, if the fastening work to be performed on a single work target includes fastening work sessions A and B and the fastening work session B is supposed to be performed, after the fastening work session A has been done on the work target, on the same work target as in the fastening work session A, then the transmission condition may be that the work result storage unit 542 store the work result of the fastening work session B.

The communications device control unit 53 preferably includes a computer system. In the computer system, a processor such as a central processing unit (CPU) or a micro-processing unit (MPU) reads out a program stored in a memory and executes the program, thus performing the functions of the communications device control unit 53 either partially or entirely The computer system includes as a principal hardware component, a processor that operates in accordance with the program. Any type of processor may be used as long as the processor may perform the intended functions by executing the program. The processor may be made up of a single or a plurality of electronic circuits including a semiconductor integrated circuit (IC) or a large-scale integrated circuit (LSI). Although the electronic circuit is herein called an IC or an LSI, the electronic circuit may be called by a different name depending on the degree of integration thereof. Examples of other alternative electronic circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be used for the same purpose. Those electronic circuits may be either integrated together on a single chip or distributed on multiple chips, whichever is appropriate. Those multiple chips may be aggregated together in a single device or distributed in multiple devices without limitation.

(2-4) Center Device

As shown in FIG. 1, the center device 6 includes the history storage unit 61, the center device communications unit 62, and a center device control unit 63.

The center device communications unit 62 is configured to be ready to communicate with the second communications unit 52. The center device communications unit 62 is a communications module which may establish wireless communication compliant with a communications protocol such as Wi-Fi®. Alternatively, the center device communications unit 62 may also be a communications module which may establish wired communication compliant with a communications protocol such as wired local area network (LAN).

The center device control unit 63 controls the history storage unit 61 and the center device communications unit 62. The center device control unit 63 preferably includes a computer system. In the computer system, a processor such as a central processing unit (CPU) or a micro-processing unit (MPU) reads out a program stored in a memory and executes the program, thus performing the functions of the communications device control unit 53 either partially or entirely, The computer system includes as a principal hardware component, a processor that operates in accordance with the program. Any type of processor may be used as long as the processor may perform the intended functions by executing the program. The processor may be made up of a single or a plurality of electronic circuits including a semiconductor integrated circuit (IC) or a large-scale integrated circuit (LSI). Although the electronic circuit is herein called an IC or an LSI, the electronic circuit may be called by a different name depending on the degree of integration thereof. Examples of other alternative electronic circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be used for the same purpose. Those electronic circuits may be either integrated together on a single chip or distributed on multiple chips, whichever is appropriate. Those multiple chips may be aggregated together in a single device or distributed in multiple devices without limitation.

The center device control unit 63 makes the history storage unit 61 store history information in which the torque measured value and the captured image are associated with each other. In this embodiment, the storage controller 44 makes the image storage unit 32 store the captured image in association with the torque measured value. This allows the history storage unit 61 to store history information in which the torque measured value measured by the measuring unit 13 and the captured image generated by the image capturing unit 14 are associated with each other. The history storage unit 61 may be implemented as, for example, a magnetic core memory or a semiconductor memory.

(3) Operation

Next, it will be described with reference to the sequence chart shown in FIG. 4 how the electric tool system 100 according to this embodiment operates until the electric tool system 100 stores the history information of the fastening work. In this embodiment, a single work target has two fastening work spots, and the worker performs fastening work sessions A and B on the single work target. More specifically, the worker performs, after finishing performing the fastening work session A on a work target, the fastening work session B on the same work target.

Before the work starts to be performed, the administrator who manages the fastening work enters setting information of the fastening work through the setting input unit 55 of the communications device 5. Then, the communications device control unit 53 makes the setting storage unit 541 store the setting information of the fastening work (in S01). The setting information of the fastening work includes the work order numbers of the fastening work, the torque settings, and the transmission condition. More specifically, the work order numbers according to this embodiment indicate that fastening work sessions A and B are going to be performed on a single work target and the fastening work session B will be performed after the fastening work session A has been done. The torque settings according to this embodiment are respective fastening torque values for fastening work sessions A and B. The transmission condition according to this embodiment is that the work result B3 of the fastening work session B be stored in the work result storage unit 542.

First, the worker starts up the electric tool device 1 (in S02). This makes the drive unit 11 ready to start performing its rotary operation in accordance with an operating command entered through the trigger switch 221. When the electric tool device 1 is started up, the communications controller 45 controls the tool communications unit 15. As a result, the tool communications unit 15 transmits, to the first communications unit 51, a startup signal indicating that the electric tool device 1 has been started up (in 803). When the first communications unit 51 receives the startup signal, the communications device control unit 53 extracts, from the setting storage unit 541, setting information A0 about the fastening work session A that is the first session of the fastening work (in 804). In this embodiment, the setting information A0 is the torque setting of the fastening work session A. Thereafter, the communications device control unit 53 controls the first communications unit 51 to transmit the setting information A0 (in 505).

Then, the driving controller 41 controls the drive unit 11 in accordance with the setting information A0 that the tool communications unit 15 has received to perform the fastening work session A (in S06). More specifically, the driving controller 41 controls the drive unit 11 and makes the drive unit 11 perform the fastening work session A to allow the estimated value of the fastening torque to reach the torque setting of the fastening work session A that the tool communications unit 15 has received. Next, the measuring controller 42 controls the measuring unit 13 to measure, as a torque measured value A1 (torque value A1), the maximum value of the fastening torque applied by the impact mechanism 12 to the fastening member. The storage controller 44 makes the measuring storage unit 31 store the torque measured value A1 measured by the measuring unit 13 (in S07). Then, the image capturing unit 14 generates a captured image A2 by capturing an image of the holder 112 that has finished the fastening work. The storage controller 44 makes the image storage unit 32 store the captured image A2, generated by the image capturing unit 14, in association with the torque measured value A1 that is already stored in the measuring storage unit 31 (in S08). Thereafter, the communications controller 45 controls the tool communications unit 15 to transmit the torque measured value A1 and the captured image A2 to the first communications unit 51 (in S09).

After the first communications unit 51 has received the torque measured value A1 and the captured image A2, the communications device control unit 53 makes the work result storage unit 542 store, as the work result A3 of the fastening work session A, the torque measured value A1 and the captured image A2 (in S10). Thereafter, the communications device control unit 53 extracts, from the setting storage unit 541, setting information B0 about the fastening work session B that is the next session of the fastening work (in S11). In this embodiment, the setting information B0 is the torque target value of the fastening work session B. Thereafter, the communications device control unit 53 controls the first communications unit 51 to transmit the setting information B0 (in S12).

As in the fastening work session A, the driving controller 41 controls the drive unit 11 and the impact mechanism 12 in accordance with the setting information B0 that the tool communications unit 15 has received to perform the fastening work session B (in S13). The measuring controller 42 controls the measuring unit 13 to measure, as a torque measured value B1 (torque value B1), the maximum value of the fastening torque applied by the impact mechanism 12 to the fastening member. The storage controller 44 makes the measuring storage unit 31 store the torque measured value B1 measured by the measuring unit 13 (in S14). Then, the image capturing unit 14 generates a captured image B2 by capturing an image of the holder 112 that has finished the fastening work. The storage controller 44 makes the image storage unit 32 store the captured image B2, generated by the image capturing unit 14, in association with the torque measured value B1 that is already stored in the measuring storage unit 31 (in S15). Thereafter, the communications controller 45 controls the tool communications unit 15 to transmit the torque measured value B1 and the captured image B2 to the first communications unit 51 (in S16).

After the first communications unit 51 has received the torque measured value B1 and the captured image B2, the communications device control unit 53 makes the work result storage unit 542 store, as the work result B3 of the fastening work session B, the torque measured value B1 and the captured image B2 (in S17). At this time, the work result B3 of the fastening work session B is stored in the work result storage unit 542, and therefore, the transmission condition stored in the setting storage unit 541 is satisfied. Thus, the communications device control unit 53 transmits the work results A3 and B3, which are stored in the work result storage unit 542, to the center device communications unit 62 (in S18). The center device control unit 63 controls the history storage unit 61 to store the work results A3 and B3 as history information. In addition, in the work result A3, the torque measured value A1 and the captured image A2 are already associated with each other by the storage controller 44. Likewise, in the work result B3, the torque measured value B1 and the captured image B2 are already associated with each other by the storage controller 44. This allows the electric tool system 100 to store, in the history storage unit 61, history information in which the captured image generated by the image capturing unit 14 is associated with the torque measured value measured by the measuring unit 13 (in S19).

Figure 4:
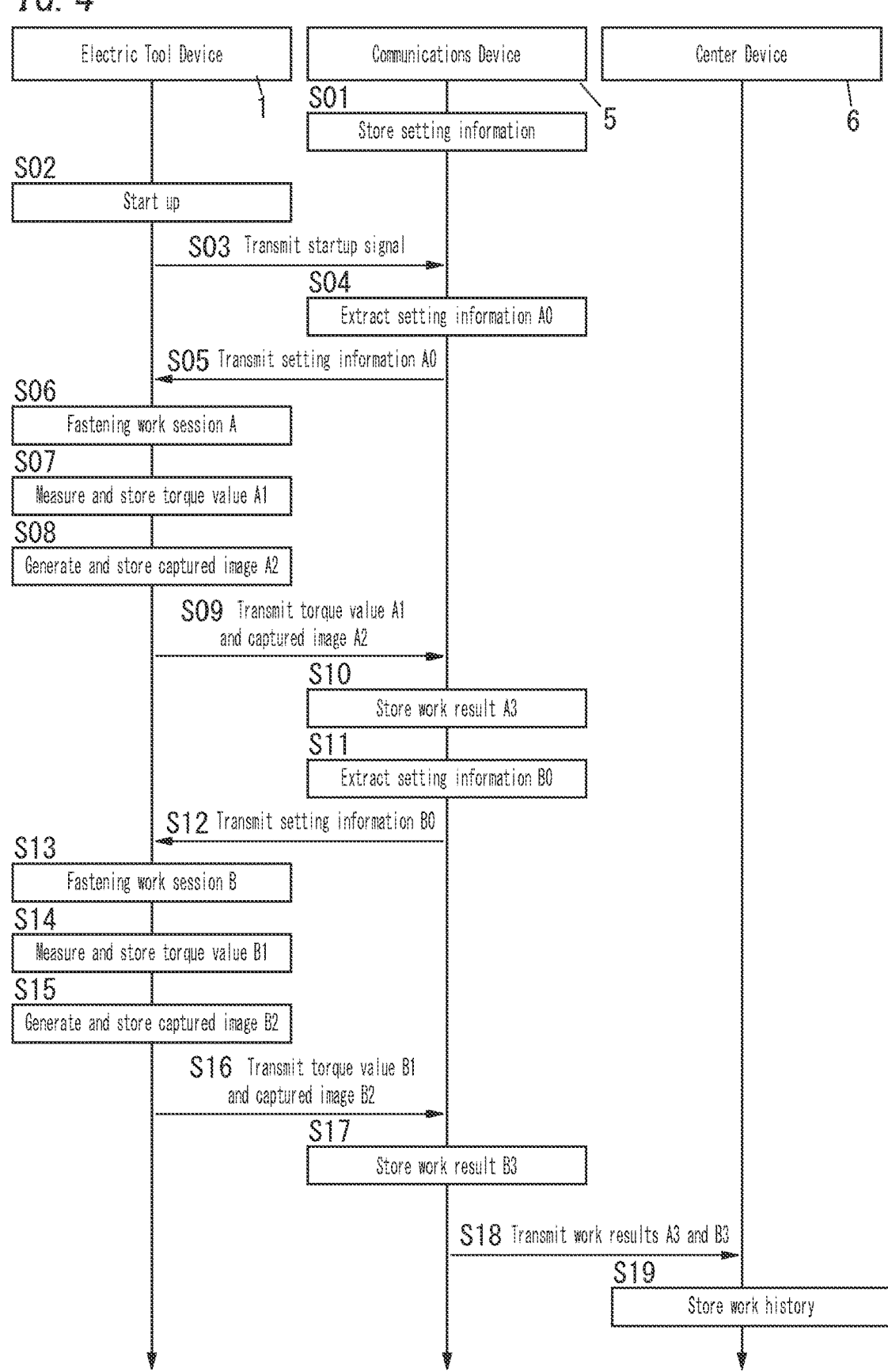
FIG. 4 is a sequence chart showing an operating procedure of the electric tool system.

Note that the sequence chart shown in FIG. 4 shows just an exemplary operating procedure of the electric tool system 100 according to this embodiment. Thus, the processing steps shown in FIG. 4 may be performed in a different order as appropriate, or at least one of the processing steps may be omitted as appropriate.

(4) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Note that the variations to be described below may be adopted in combination as appropriate.

In the exemplary embodiment described above, the center device 6 includes the history storage unit 61. Alternatively, the work result storage unit 542 included in the communications device 5 may also serve as the history storage unit 61. Still alternatively, the tool storage unit 3 included in the electric tool device 1 may also serve as the history storage unit 61.

In the exemplary embodiment described above, the image capturing unit 14 is provided as an integral part of electric tool device 1. Alternatively, the image capturing unit 14 may be provided separately from, and attached to, the electric tool device 1.

Also, in the exemplary embodiment described above, the captured image is stored in the image storage unit 32 in association with the torque measured value that has already been stored there by the storage controller 44. However, the torque measured value and the captured image may be associated with each other at any timing. Alternatively, the torque measured value and the captured image may be associated with each other when stored as a work result in the work result storage unit 542, for example. Still alternatively, the torque measured value and the captured image may also be associated with each other when stored in the history storage unit 61.

In the exemplary embodiment described above, the image capturing unit 14 generates the captured image by capturing an image of the holder 112 after the fastening work has been done. Alternatively, the image capturing unit 14 may generate captured images at multiple different timings on the time axis by capturing an image of the holder 112 at each of the multiple different timings. In that case, the history storage unit 61 stores the plurality of captured images in association with the torque measured value. The multiple different timings may be, for example, a first timing when the drive unit 11 starts performing the fastening work and a second timing when the drive unit finishes performing the fastening work.

A transmission condition according to an aspect may be that a preset time pass since the communications device 5 has transmitted the work result to the center device 6 last time. More specifically, the transmission condition may be that a preset time pass since the second communications unit 52 has transmitted the work result to the center device communications unit 62 last time.

A transmission condition according to another aspect may be that the number of work results stored in the communications device storage unit 54 reach a preset number. More specifically, the transmission condition may be that the number of work results stored in the work result storage unit 542 reach the preset number.

According to still another aspect, the communications device storage unit 54 may store a training image that allows the electric tool device 1 to identify the fastening work spot. More specifically, the setting storage unit 541 may store, as a piece of session-by-session setting information, a training image that allows the driving controller 41 to identify the fastening work spot in association with the torque setting.

In that case, the communications device control unit 53 extracts the setting information from the setting storage unit 541 and the first communications unit 51 transmits the setting information to the tool communications unit 15. Thereafter, the driving controller 41 identifies the fastening work spot based on the captured image that has been generated by the image capturing unit 14 at the beginning of the fastening work and the training image received by the tool communications unit 15. As a result, the driving controller 41 controls the drive unit 11 such that the fastening torque value becomes equal to a torque setting associated with the training image.

According to still another aspect, the communications controller 45 may control the tool communications unit 15 to transmit the torque measured values and captured images stored in the tool storage unit 3 to the first communications unit 51 collectively every time a predetermined number of fastening work sessions have been done. In that case, the communications device storage unit 54 further stores, as a piece of setting information, information about the number of fastening members to be fastened by the drive unit 11 in the multiple fastening work sessions. More specifically, the setting storage unit 541 further stores, as a piece of setting information, information about the number of fastening members to be fastened by the drive unit 11 in the multiple fastening work sessions.

In that case, the communications device control unit 53 extracts information about the number of fastening members to fasten from the setting storage unit 541 and the first communications unit 51 transmits information about the number of fastening members to fasten to the tool communications unit 15. Thereafter, the communications controller 45 controls the tool communications unit 15 in accordance with the information about the number of fastening members to fasten. As a result, the tool communications unit 15 collectively transmits, to the tool communications unit 15, the torque measured values and captured images that have been stored in the tool storage unit 3 until the drive unit 11 finishes doing the multiple fastening work sessions.

According to yet another aspect, the measuring unit 13 may measure, as the torque measured value, the average value of the fastening torque applied by the impact mechanism 12 to the fastening members via the output shaft 111. Alternatively, the measuring unit 13 may also measure, as the torque measured value, the fastening torque value that the driving controller 41 decides has reached the torque setting.

(5) Recapitulation

As can be seen from the foregoing description, an electric tool system (100) according to a first aspect includes an electric tool device (1) and a history storage unit (61). The electric tool device (1) includes a holder (112), a drive unit (11), a measuring unit (13), and an image capturing unit (14). The holder (112) holds a fastening member thereon. The drive unit (11) performs fastening work of fastening the fastening member into a work target by transmitting driving force to the holder (112). The measuring unit (13) measures, as a torque measured value, a fastening torque value of the fastening work. The image capturing unit (14) generates a captured image by capturing an image of at least a part of the holder (112). The history storage unit (61) stores history information in which the torque measured value and the captured image are associated with each other.

This aspect achieves the advantage of acquiring and storing history information irrespective of the work target.

In an electric tool system (100) according to a second aspect, which may be implemented in conjunction with the first aspect, the image capturing unit (14) generates the captured image by capturing the image of at least the part of the holder (112) after the drive unit (11) has finished the fastening work.

This aspect achieves the advantage of allowing the worker to confirm, by checking the captured image, that the fastening member has been attached to a correct position.

In an electric tool system (100) according to a third aspect, which may be implemented in conjunction with the first aspect, the image capturing unit (14) generates a plurality of the captured images at multiple different timings, respectively, on a time axis by capturing the image of at least the part of the holder (112) at each of the multiple different timings. The history storage unit (61) stores the plurality of the captured images in association with the torque measured value.

This aspect achieves the advantage of allowing the worker to investigate, when the fastening member has any imperfection, such as loosening, the cause of the imperfection by checking a plurality of captured images shot at multiple different timings on the time axis.

In an electric tool system (100) according to a fourth aspect, which may be implemented in conjunction with the third aspect, the multiple different timings are a first timing at which the drive unit (11) starts performing the fastening work and a second timing at which the drive unit (11) finishes performing the fastening work.

This aspect achieves the advantage of allowing the worker to investigate, when the fastening member has any imperfection, such as loosening, the cause of the imperfection by checking captured images shot before and after the fastening work.

In an electric tool system (100) according to a fifth aspect, which may be implemented in conjunction with any one of the first to fourth aspects, the electric tool system (100) includes a plurality of the electric tool devices (1). The electric tool system (100) further includes: a communications device (5) that is ready to communicate with the plurality of the electric tool devices (1); and a center device (6) that is ready to communicate with the communications device (5). The communications device (5) receives data about the torque measured value and the captured image from each of the plurality of electric tool devices (1) and transmit the data to the center device (6). The center device (6) includes the history storage unit (61).

According to this aspect, the center device (6) stores the history information of the fastening work collectively, thus achieving the advantage of allowing the center device (6) to investigate, when the fastening member has any imperfection, such as loosening, the cause of the imperfection by itself.

In an electric tool system (100) according to a sixth aspect, which may be implemented in conjunction with the fifth aspect, the communications device (5) includes a communications device storage unit (54). The communications device storage unit (54) receives the data about the torque measured value and the captured image from each of the plurality of the electric tool devices (1) and store the data as a work result, every time a session of the fastening work is done by the plurality of electric tool devices (1). The communications device (5) transmits, when a predetermined transmission condition is satisfied, the work result stored in the communications device storage unit (54) to the center device (6).

This aspect achieves the advantage of reducing the number of times of communication to establish between the communications device (5) and the center device (6).

In an electric tool system (100) according to a seventh aspect, which may be implemented in conjunction with the sixth aspect, the predetermined transmission condition is that a preset time pass since the communications device (5) has transmitted the work result to the center device (6) last time.

This aspect achieves the advantage of allowing the communications device (5) to transmit the data about the torque measured value and the captured image to the center device (6) every time a preset time passes.

In an electric tool system (100) according to an eighth aspect, which may be implemented in conjunction with the sixth aspect, the predetermined transmission condition is that a numerical number of the work results stored in the communications device storage unit (54) reach a preset number.

This aspect achieves the advantage of allowing the communications device (5) to transmit the data about the torque measured value and the captured image to the center device (6) every time a preset number of work results are stored in the communications device storage unit (54).

In an electric tool system (100) according to a ninth aspect, which may be implemented in conjunction with the sixth aspect, the fastening work includes multiple sessions. The predetermined transmission condition is that the communications device storage unit (54) store a work result of a prescribed one of the multiple sessions of the fastening work.

This aspect achieves the advantage of allowing the communications device (5) to transmit the data about the torque measured value and the captured image to the center device (6) every time a work result of a prescribed session of the fastening work is stored in the communications device storage unit (54).

Note that the constituent elements according to the second to ninth aspects are not essential constituent elements for the electric tool system (100) according to the first aspect but may be omitted as appropriate.

REFERENCE SIGNS LIST

100 Electric Tool System
1 Electric Tool Device
11 Drive Unit
112 Holder
13 Measuring Unit
14 Image Capturing Unit
5 Communications Device
54 Communications Device Storage Unit
6 Center Device
61 History Storage Unit

The invention claimed is:

1. An electric tool system comprising:
a plurality of electric tool devices;
a history storage unit;
a communications device configured to be ready to communicate with the plurality of the electric tool devices; and
a center device configured to be ready to communicate with the communications device, wherein:
each of the plurality of electric tool devices includes:
  a holder configured to hold a fastening member thereon;
  a drive unit configured to perform fastening work of fastening the fastening member into a work target by transmitting driving force to the holder;
  a measuring unit configured to measure, as a torque measured value, a fastening torque value of the fastening work; and
  an image capturing unit configured to generate a captured image by capturing an image of at least a part of the holder,
the history storage unit is configured to store history information in which the torque measured value and the captured image are associated with each other,
the communications device is configured to receive data about the torque measured value and the captured image from each of the plurality of the electric tool devices and transmit the data to the center device,
the center device includes the history storage unit,
the communications device includes a communications device storage unit,
the communications device storage unit is configured to receive the data about the torque measured value and the captured image from each of the plurality of the electric tool devices and store the data as a work result, every time a session of the fastening work is done by the plurality of the electric tool devices, and
the communications device is configured to, when a predetermined transmission condition is satisfied, transmit the work results stored in the communications device storage unit to the center device.

2. The electric tool system of claim 1, wherein
the image capturing unit is configured to generate the captured image by capturing the image of at least the part of the holder after the drive unit has finished the fastening work.

3. The electric tool system of claim 1, wherein
the image capturing unit is configured to generate a plurality of the captured images at multiple different timings, respectively, on a time axis by capturing the image of at least the part of the holder at each of the multiple different timings, and the history storage unit is configured to store the plurality of the captured images in association with the torque measured value.

4. The electric tool system of claim 3, wherein the multiple different timings are a first timing at which the drive unit starts performing the fastening work and a second timing at which the drive unit finishes performing the fastening work.

5. The electric tool system of claim 1, wherein the predetermined transmission condition is that a preset time has passed since the communications device has transmitted the work result to the center device last time.

6. The electric tool system of claim 1, wherein the predetermined transmission condition is that a numerical number of the work results stored in the communications device storage unit has reached a preset number.

7. The electric tool system of claim 1, wherein the fastening work includes multiple sessions, and the predetermined transmission condition is that the communications device storage unit has stored a work result of a prescribed one of the multiple sessions of the fastening work.

* * * * *